(12) United States Patent
Blumenau

(10) Patent No.: US 6,418,470 B2
(45) Date of Patent: *Jul. 9, 2002

(54) METERING OF INTERNET CONTENT USING A CONTROL

(75) Inventor: Trevor Blumenau, Redwood City, CA (US)

(73) Assignee: Nielsen Media Research, Inc., Schaumburg, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/791,268

(22) Filed: Feb. 22, 2001

Related U.S. Application Data

(63) Continuation of application No. 09/111,963, filed on Jul. 8, 1998, now Pat. No. 6,327,619.

(51) Int. Cl.[7] ................................................. G06F 11/30
(52) U.S. Cl. ........................................ 709/224; 705/14
(58) Field of Search ................................ 709/224, 223; 705/14

(56) References Cited

U.S. PATENT DOCUMENTS

| | | | | |
|---|---|---|---|---|
| 5,675,510 A | | 10/1997 | Coffey et al. | 709/224 |
| 5,710,887 A | * | 1/1998 | Chelliah et al. | 705/26 |
| 5,796,952 A | * | 8/1998 | Davis et al. | 709/224 |
| 6,141,010 A | * | 10/2000 | Hoyle | 345/356 |
| 6,327,619 B1 | * | 12/2001 | Blumenau | 709/224 |

* cited by examiner

*Primary Examiner*—Kenneth R. Coulter
(74) *Attorney, Agent, or Firm*—Katten Muchin Zavis Rosenman

(57) ABSTRACT

Web content received by a computer is processed such that a reference to a control is inserted in HTML received by the computer and the control is executed in response to the reference in order to process the web content in the received HTML. The control interfaces with a meta-level of program code, such as a browser, in order to process the web content. The control, for example, may be executed in order to meter exposure of an object, such as an advertising image object.

71 Claims, 4 Drawing Sheets

METERING OF INTERNET CONTENT USING A CONTROL

This is a Continuation of U.S. application Ser. No. 09/111,963, filed Jul. 8, 1998, now U.S. Pat. No. 6,327,619.

RELATED APPLICATION

The invention of the present application is related to the invention covered by U.S. patent application Ser. No. 08/707,279 filed on Sep. 3, 1996, now U.S. Pat. No. 6,108,637.

TECHNICAL FIELD OF THE INVENTION

The present invention relates to an arrangement whereby Internet content is metered using a browser control such as a Windows ActiveX Control.

BACKGROUND OF THE INVENTION

The Internet has proven to be an efficient and popular mechanism for the dissemination of information from content providers to content recipients. Content providers in many cases are organizations, such as businesses, governmental agencies, educational institutions, and the like, who operate Web sites where such organizations provide information that can be downloaded by content recipients. The content recipients are often consumers who use computers typically located in their dwellings to access the content provided by content providers. However, content recipients may also be other businesses, governmental agencies, educational institutions, and the like. In many cases, a content provider is also a content recipient. The information provided by content providers to content recipients often includes advertisements in which organizations advertise their goods and/or services.

Content is typically provided directly by a Web site to content recipients. However, additional information concerning such content is frequently provided at another Web site and is accessed by way of click-through URLs.

Often, the operators of Web sites offering content such as advertisements to content recipients, as well as those who create and place such content as offerings by Web sites, desire to measure the amount exposure of the content. Exposure is typically determined by the number of times that particular offerings are provided visibly and/or audibly to content recipients. Web site owners, and those who create and place content, may then draw market relevant conclusions from the measured amount of exposure.

Several arrangements have been proposed as attempts to measure exposure. For example, it is known for a Web site to itself measure the number of times that content recipients access its content offerings. However, exposure can at best only be inferred from this measurement because the Web site cannot determine for certain whether the content of interest is ever visible or audible to the content recipient. Also, a measurement at a single Web site provides little information about exposure of the content offered by other Web sites, such as competitive Web sites. Moreover, even if measurements are made at a plurality of Web sites, it is difficult to extrapolate the resulting data over relevant segments of the population.

Therefore, it has also been proposed to install software meters on the computers of panelists so that exposure to content of panelists can be measured and extrapolated over the population as a whole, in much the same way that TV ratings are generated. According to this proposal, the software meters track operating system messages in order to detect communications of interest. When the software meters detect communications of interest, the software meters log the titles of the corresponding windows which are displayed to a computer user because Internet content, as well as application software interfaces, are typically provided to the user in a window format. However, logging titles of windows is not particularly useful because such titles can be very generic. For example, one such title which is popular with many content providers is simply "Home Page." This title provides little indication of the information supplied to the content recipient.

Tagging of Internet content has been broadly suggested in the context of requiring widespread industry cooperation. However, it is unlikely that such widespread industry cooperation is attainable.

Moreover, now that the source code of the Netscape Navigator®, browser has been made publicly available, it is possible to provide a software meter by appropriate modification of this browser. For example, this source code defines several objects that represent both the screen position and state of images being displayed in the browser. The methods implemented by these objects may be augmented to include a software meter for collecting exposure data. However, in this case, the browser operating on a panelists computer must be replaced by the browser which is modified to measure content exposure. Accordingly, panelist cooperation becomes an issue. Also, extreme care must be taken to avoid unintended consequences of modifying browser code.

Furthermore, this browser alteration option is not available with respect to the Internet Explorer browser because its source code is not available.

The present invention is directed to a metering system which solves one or more of the above noted problems.

SUMMARY OF THE INVENTION

In accordance with one aspect of the present invention, a method is provide to meter web content received by a computer. The method is implemented through execution of program code by the computer and includes the following steps: a) obtaining a list of objects in the web content by use of a meta-level of the program code; and b) metering exposure of the listed objects.

In accordance with another aspect of the present invention, a method is provided to process web content received by a computer. The method is implemented through execution of program code by the computer, and includes the following steps: a) inserting a reference to a control in HTML received by the computer; and b) executing the control in response to the reference in order to process the web content in the received HTML.

In accordance with yet another aspect of the present invention, a method is provided to use a meta-level of a browser so that exposure of an object contained in received HTML can be metered. The method comprises the following steps: a) accessing the object in the HTML; and b) using the meta-level in order to meter exposure of the object.

In accordance with still another aspect of the present invention, a software meter is executed by a computer in order to meter exposure of an object contained in HTML received by the computer. The computer runs a browser having a meta-layer. The software meter includes a control arranged to access the meta-level in order to meter exposure of the object.

BRIEF DESCRIPTION OF THE DRAWINGS

These and other features and advantages of the present invention will become more apparent from a detailed consideration of the invention when taken in conjunction with the drawings in which.

DETAILED DESCRIPTION

Figure 1:
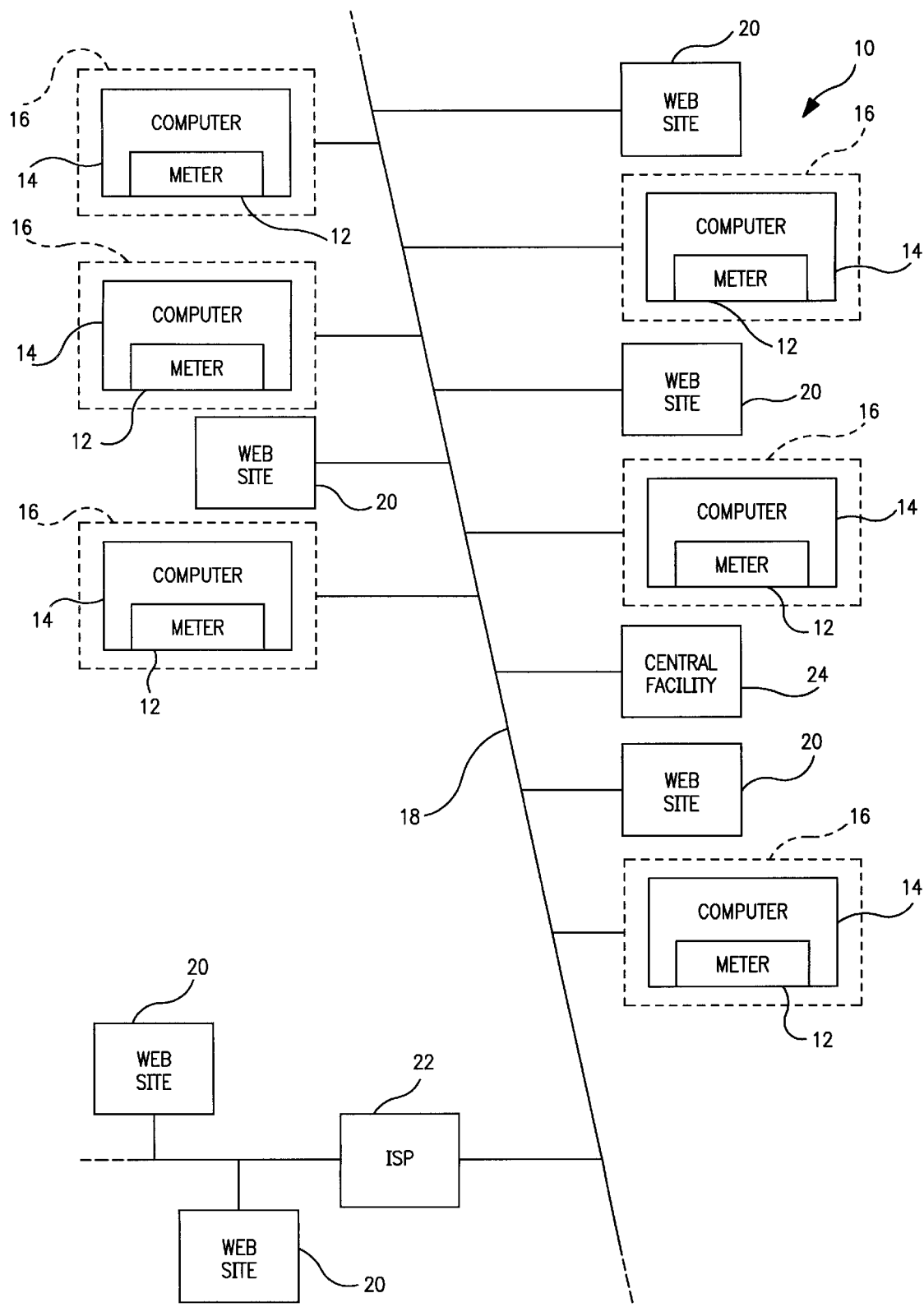
FIG. 1 illustrates a metering system which is in accordance with the present invention and which includes a plurality of meters each of which is resident on a computer at a corresponding statistically selected site.

Some programs have meta-levels which permit a programmer to access certain objects and methods of the programs so that the programmer can supplement these programs in a way to serve the needs of the programmer. The Internet Explorer browser, for example, has a meta-level which is generally known as the Component Object Module (COM). Another meta-level in Java programming is known as CORBA (Common Object Request Broker Architecture). The present invention uses a program's meta-level in order to process Internet content. For example, the present invention may be arranged to meter exposure of Internet content. In one embodiment of the present invention, a reference to a control, such as an ActiveX control, is inserted into a received HTML file. When a browser interpreting the received HTML file encounters the reference, the browser causes the control to be executed. As the control is executed, it uses the browser's meta-level so that the content defined by the HTML file is suitably processed.

In a specific example of the present invention, a metering system 10 includes a plurality of meters 12, where each meter 12 is installed on a corresponding computer 14 at a corresponding statistically selected metering site 16. The number and locations of these statistical selected metering sites 16 depend upon statistical sampling methods. However, a sufficient number of statistically selected metering sites 16 should be selected in order to provide data which is representative of the population segments relevant to the content being metered.

Each of the computers 14, as shown in FIG. 1, is connected to a network 18 which may be, for example, the Internet. As is known, the Internet is typically accessed through the public telephone network. However, the network 18 may involve other arrangements such as local area networks and other networks through which content is electronically disseminated.

In the case where the network 18 is the Internet, content is typically offered by content providers who operate Web sites, such as Web sites 20 shown in FIG. 1. The Web sites 20 are connected to the network 18, either directly, or through an Internet Service Provider 22, and are arranged to provide content, usually through home pages, to the content recipients among Which are the users of the computers 14 at the statistically selected metering sites 16.

Content offered by the Web sites 20 may include objects in the form of images and, frequently, these images are advertisements. The Internet Advertising Board (IAB) has specified certain sizes for advertisements. Moreover, content such as advertisements offered by the Web sites 20 often includes click-through URLs which, when clicked, access content provided by other Web sites 20. Furthermore, these click-through locations in an image often are redirect cgi scripts that can be parsed. For example, the parameters that are passed to the cgi script can indicate that an object is an advertising banner. These parameters may further yield other site specific useful information. Additionally, an identification tag may be inserted into content such as advertisements. Images may be static images or video images. The content offered by the Web sites 20 may also include audio, text areas, and other media types which can be processed and/or metered by the present invention.

The meters 12 may be in the form of software routines to be installed on the computers 14 at the statistically selected metering sites 16. Alternatively, the meters 12 may be software and/or hardware for attachment to the computers 14 at the statistically selected metering sites 16. The meters 12 meter access by the users of the computers 14 to the advertisements and other content which are provided by the content providers operating the Web sites 20.

The meters 12 may be arranged to use a browser's meta-level in order to meter the advertisements and other content provided by the Web sites 20. For example, the meters 12 may be arranged to insert a reference to a control, such as an ActiveX control, in the HTML file received by corresponding computers 14. The control, when executed, uses the meta-level to determine whether the received pages contain objects of interest and to meter exposure of these objects to the users of the computers 14. It should be noted, however, that a meta-level of a browser or other program can be used according to the present invention without necessarily inserting a reference to a control in received HTML file.

The meters 12 may also be used to collect demographic information about the users of the computers 14 who access advertisements and other content provided by the Web sites 20. For example, the meters 12 may be arranged to require the users to actively identify themselves at log on and/or whenever the users access the content provided by the Web sites 20. Alternatively, the meters 12 may be arranged to passively identify the users, at log on and/or whenever the users access content, by detecting keystroke differences between users, by employing face and/or body recognition technology, and/or the like.

The information, including metered content and demographic data, collected by the meters 12 may be periodically transferred to a central facility 24, where this information may be extrapolated over relevant populations and assembled into reports for use by interested customers of the central facility 24. This information may be manually transferred to the central facility 24, such as by the mailing of diskettes containing the information, or this information may be transferred electronically to the central facility 24, such as through the network 18.

Figure 2:
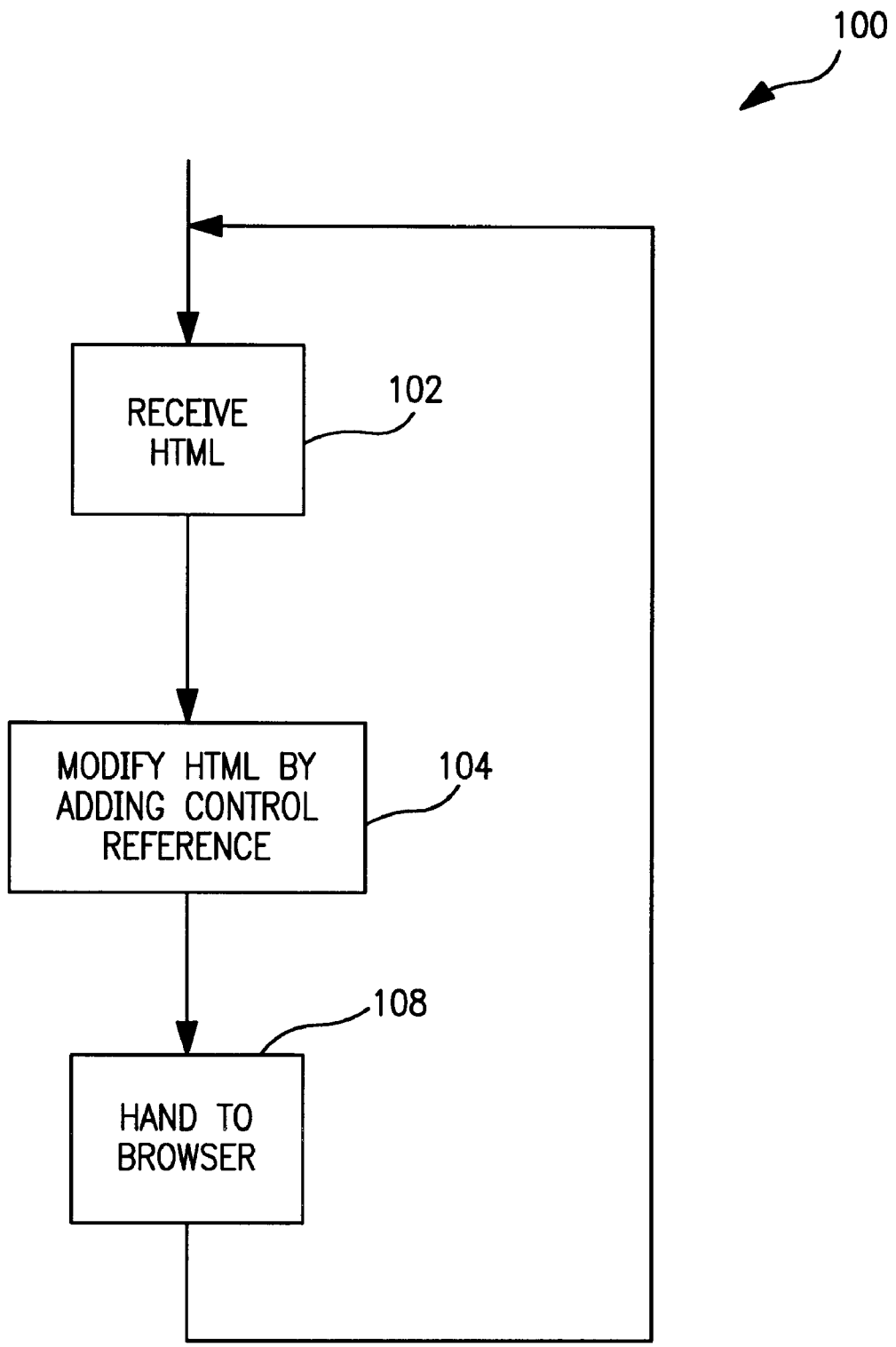
FIG. 2 illustrates an exemplary embodiment of a software routine which may be used for the meters shown in FIG. 1; and, FIGS. 3 and 4 illustrates a control that can be used in conjunction with the software routine of FIG. 2 to meter exposure of Internet content.
Figure 3:
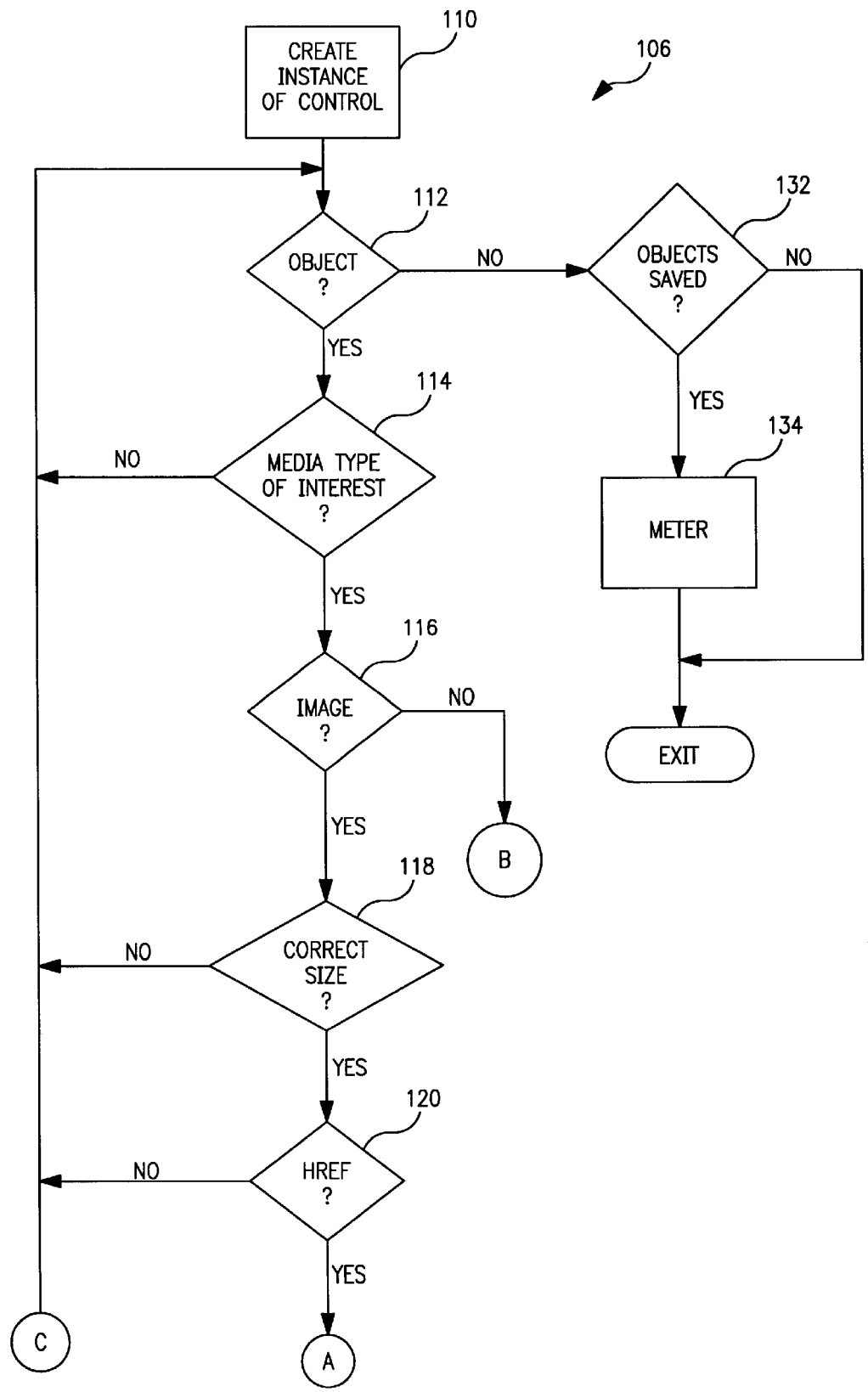
Figure 4:
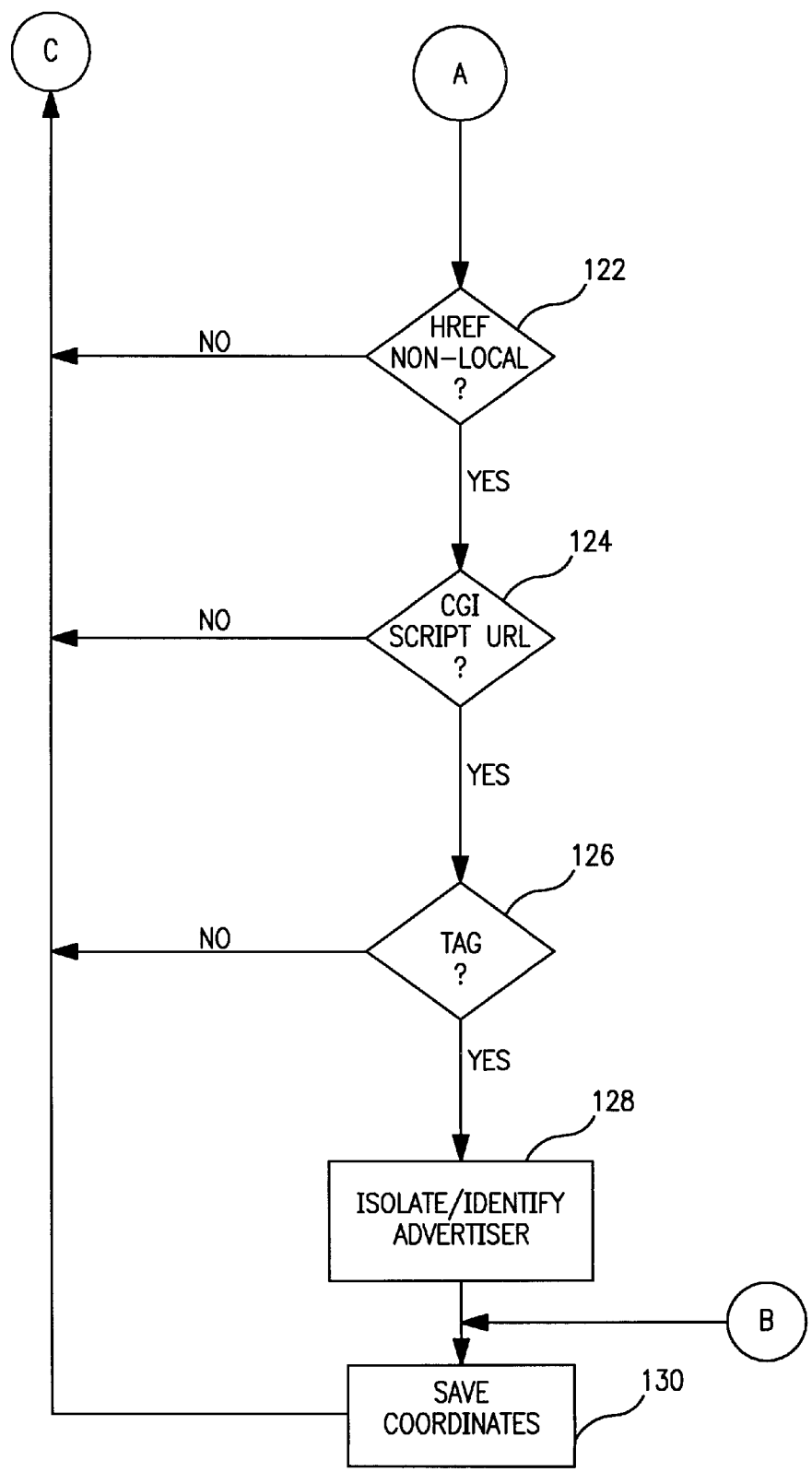

Each of the meters 12 can be implemented in accordance with a software routine 100 that is illustrated in FIG. 2. When a message containing HTML is received by one of the computers 14 executing the software routine 100, as indicated by a block 102, the software routine 100 at a block 104 intercepts the corresponding HTTP transfer messages between the TCP/IP socket and the browser, and modifies the received HTML file by inserting a reference to a control 106 (FIGS. 3 and 4). For example, the software routine 100 may be arranged to insert the control reference as a nxm pixel object in the page defined by the HTML file, where n and m are both typically 1 but can be any other suitable numbers, including zero. This object can be inserted at any predetermined location in the HTML file such as before the <HEAD> tag, anywhere inside the <HEAD> block, between the <HEAD> and <BODY> tags, or anywhere inside the <BODY> block. This object may be preferably prepended as an executable identifier to the very beginning of the page. For example, the executable identifier may be in the following syntax:

<object classid=046fedd05-99-fe-f5-f4 width=1 height=1 name=NMRActiveXObject> where the control in this example is an ActiveX control. If desired, the nxm pixel object can be inserted in an off-screen location. After the control reference is inserted, the software routine 100 at a block 108 hands off the received HTML file with the inserted control reference to the browser running on the corresponding computer 14.

When the browser begins executing the HTML file with the control reference, it creates an instance of the control 106 as indicated by a block 110 of FIG. 3. The control 106 may be provided, for example, as a plug in of the browser running on the computer 14. When the browser accesses the control 106, the control 106 is executed as shown in the remainder of FIGS. 3 and in FIG. 4. Accordingly, the control 106 begins at a block 112 to iterate through the list of objects on the page contained in the received HTML file. For example, the control 106 at the block 112 may call for a list object from the COM interface. The list object lists the objects in the received HTML file. If the HTML file contains an unprocessed object as determined at the block 112, the control 106 calls one or more appropriate COM methods and/or operating system procedures in order to determine whether a first of the unprocessed objects is one that the meter 12 is arranged to meter. Accordingly, the control 106 determines at a block 114 whether the object contained in the HTML file is a media type that should be metered.

If the object is not a media type that should be metered, the control 106 at the block 112 investigates the next object in the HTML file. However, if the object is a media type that should be metered, the control 106 at a block 116 determines whether the object is an image. If the object is an image, the control 106 at a block 118 determines whether the image has a predetermined size. For example, if the meter 12 is arranged to meter advertisements, the predetermined size may be any of the sizes specified by the IAB for Internet advertisements. If the image does not have the predetermined size, the control 106 investigates the next object on the page at the block 112. If the image does have the predetermined size, the control 106 then determines at a block 120 whether the image has an HREF. If the image does not have an HREF, the control 106 investigates the next object in the received HTML file at the block 112. If the image does have an HREF, the control 106 then determines at a block 122 whether the HREF is a non-local HREF, indicating that the HREF is a link to another Web site. If the HREF is local rather than non-local, the control 106 investigates the next object in the received HTML file at the block 112.

If the HREF is non-local, the control 106 then determines at a block 124 whether the HREF is a cgi script URL. If the HREF is not a cgi script URL, the control 106 investigates the next object in the HTML file. If the HREF is a cgi script URL, the control 106 at a block 126 determines whether the HREF contains an identification tag. If the HREF does not contain have an identification tag, the control 106 investigates the next object in the HTML file.

If the HREF does contain an identification tag, the control 106 at a block 128 attempts to isolate or identify the advertiser associated with the HREF in the object currently being processed. For example, the object may itself contain an identification of the advertiser. After the control 106 at a block 128 attempts to isolate or identify the advertiser associated with the HREF from the object currently being processed, or if the object is another media type that should be metered but is not an image, the control 106 at a block 130 determines and saves the coordinates of the image or other media type for metering. When the coordinates have been determined and saved, program flow returns to the block 112 where the control 106 continues to process, in like manner, the remaining objects in the received HTML file. When the control 106 iterates through all objects on the page, the control 106 at a block 132 determines whether the coordinates of any image or other media type were saved at the block 126. If no images and/or other media types were saved at the block 126, the control 106 exits.

If one or more images and/or other media type were saved at the block 130, the control 106 at a block 134 meters the use of the images and/or other media type whose coordinates were saved. Thus, the control 106 can track changes in the coordinates, occlusion of the images or other media types, and the like.

The control 106 can also keep track of the exposure over time for each metered image. Accordingly, as the metered content is scrolled into or out of view, the control 106 maintains, for example, a counter of the on-screen exposure time of the metered content. Similarly, if a window is moved so as to occlude the metered content, the time that the window is in front of the metered content can be deducted from the on-screen exposure time of the metered content. Also, if the browser window is iconified, the time that the browser window is iconified can be deducted from the on-screen exposure of the metered content.

The exposure data may be combined with other information (which may be obtained through other COM method calls on the metered content) such as any frame URL, image file URL, click-through URL, ALT text, and/or identification tag, and/or the exposure data may be combined with user identification data. The collected data can then be forwarded to the central facility 24 for analysis. For example, as discussed above, the information may be extrapolated over relevant populations and assembled into reports for use by interested customers of the central facility 24.

After the control 106 meters the use of the media types whose coordinates were saved, or if no objects were found in the received HTML file as determined at the block 112, the control 106 exits and the software routine 100 waits for another HTML file.

Certain modifications of the present invention have been discussed above. Other modifications will occur to those practicing in the art of the present invention. For example, the control 106 determines whether a received image has a predetermined size at the block 118, whether the image has an HREF at the block 120, whether the HREF is non-local at the block 122, whether the HREF is a cgi script URL at the block 124, whether the image has an identification tag at the block 126, and attempts to isolate or identify the advertiser associated with the HREF at a block 128. However, the control 106 may implement any combination of these blocks. For example, the control 106 may implement any one of these blocks, any two of these blocks, or any three of these blocks.

Also, the meters 12 may be installed on the computers 14 by personnel of the central facility 24, the meters 12 may be installed on the computers 14 by the panelists at the statistically selected metering sites 16 with appropriate instructions provided by personnel of the central facility 24, the meters 12 may be downloaded from the central facility 24 or elsewhere to the computers 14 of the panelists at the statistically selected metering sites 16, or the like.

Moreover, instead of installing the meters 12 on computers at statistically selected metering sites, the meters 12 can be used in a census to acquire content exposure data from an entire population segment. In this case, an Internet service provider, the central facility 24, or another facility, for example, can download the meters 10 to the computers of the relevant population segment.

Furthermore, the present invention may used for applications other than metering applications.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A method of metering web content received by a computer, the method being implemented through execution of program code by the computer, the method including the following steps:
   a) obtaining a list of objects in the web content by use of a meta-level of the program code;
   b) determining whether listed objects should be metered; and
   c) metering exposure of at least some of the listed objects.

2. The method of claim 1 wherein the web content comprises HTML, and wherein step b) includes the following step;
   detecting an image contained in the HTML.

3. The method of claim 2 wherein step b) includes the following step;
   detecting an HREF in the HTML.

4. The method of claim 2 wherein step b) includes the following step;
   detecting a cgi script URL in the HTML.

5. The method of claim 2 wherein step b) includes the following step;
   detecting an identification tag in the HTML.

6. The method of claim 2 wherein step b) includes the following step;
   c) determining when the image is displayed.

7. The method of claim 6 wherein step c) includes the following step;
   determining an amount of the image being displayed.

8. The method of claim 6 wherein step c) includes the following step;
   determining an amount of time that the image is being displayed.

9. The method of claim 8 wherein step c) includes the following step;
   determining an amount of the image being displayed.

10. The method of claim 1 wherein step b) includes the following step;
    detecting an image having a predetermined size.

11. The method of claim 10 wherein step b) includes the following step;
    determining when the image is displayed.

12. The method of claim 10 wherein step b) includes the following step;
    determining an amount of the image being displayed.

13. The method of claim 10 wherein step b) includes the following step;
    determining an amount of time that the image is being displayed.

14. The method of claim 13 wherein step b) includes the following step;
    determining an amount of the image being displayed.

15. The method of claim 10 wherein the web content comprises HTML, and wherein step b) includes the following step;
    detecting an HREF in the HTML.

16. The method of claim 10 wherein the web content comprises HTML, and wherein step b) includes the following step;
    detecting a cgi script URL in the HTML.

17. The method of claim 10 wherein the web content comprises HTML, and wherein step b) includes the following step;
    detecting an identification tag in the HTML.

18. The method of claim 1 wherein step b) includes the following steps:
    detecting an HREF in the web content; and,
    metering at least one of the listed objects only if the HREF is detected.

19. The method of claim 1 wherein step b) includes the following steps:
    detecting a cgi script URL in the web content; and,
    metering at least one of the listed objects only if the cgi script URL is detected.

20. The method of claim 1 wherein step b) includes the following steps:
    detecting an identification tag in the web content; and,
    metering at least one of the listed objects only if the identification tag is detected.

21. The method of claim 1, wherein the step of determining whether listed objects should be metered includes the step of detecting an audio object.

22. The method of claim 1, wherein the step of determining whether listed objects should be metered includes the step of detecting a text object.

23. The method of claim 1, wherein the step of determining whether listed objects should be metered includes the step of detecting objects having media types that can be metered.

24. A method of processing web content received by a computer, the method being implemented through execution of program code by the computer, the method including the following steps:
    a) inserting a reference to a control in HTML received by the computer; and,
    b) executing the control in response to the reference in order to process the web content in the received HTML.

25. The method of claim 24 wherein the control is a plug-in of a browser.

26. The method of claim 25 wherein the control accesses methods from a meta-level of the browser.

27. The method of claim 24 wherein the control accesses methods from a meta-level of the program code.

28. The method of claim 24 wherein step b) comprises the step of detecting an image contained in the HTML.

29. The method of claim 28 wherein step b) comprises the step of detecting an HREF in the image.

30. The method of claim 28 wherein step b) comprises the step of detecting a cgi script URL in the image.

31. The method of claim 28 wherein step b) comprises the step of detecting an identification tag in the image.

32. The method of claim 28 wherein step b) comprises the step of determining when the image is displayed.

33. The method of claim 32 wherein step b) comprises the step of determining an amount of the image being displayed.

34. The method of claim 32 wherein step b) comprises the step of determining an amount of time that the image is being displayed.

35. The method of claim 34 wherein step b) comprises the step of determining an amount of the image being displayed.

36. The method of claim 24 wherein step b) comprises the step of detecting an image having a predetermined size.

37. The method of claim 36 wherein step b) comprises the step of determining when the image is displayed.

38. The method of claim 37 wherein step b) comprises the step of determining an amount of the image being displayed.

39. The method of claim 37 wherein step b) comprises the step of determining an amount of time that the image is being displayed.

40. The method of claim 39 wherein step b) comprises the step of determining an amount of the image being displayed.

41. The method of claim 36 wherein step b) comprises the step of detecting an HREF in the image.

42. The method of claim 36 wherein step b) comprises the step of detecting a cgi script URL in the image.

43. The method of claim 36 wherein step b) comprises the step of detecting an identification tag in the image.

44. The method of claim 24 wherein the reference is an nxm pixel object, and wherein n and m are integers of any magnitude including zero.

45. The method of claim 24 wherein the reference is an executable identifier.

46. The method of claim 24 wherein step b) includes the following steps:
   detecting an HREF in the web content; and,
   metering the web content only if the HREF is detected.

47. The method of claim 24 wherein step b) includes the following steps:
   detecting a cgi script URL in the web content; and,
   metering the web content only if the cgi script URL is detected.

48. The method of claim 24 wherein step b) includes the following steps:
   detecting an identification tag in the web content; and,
   metering the web content only if the identification tag is detected.

49. A method of using a meta-level of a browser so that exposure of an object contained in received HTML can be metered, the method comprising the following steps:
   a) accessing the object in the HTML;
   b) determining whether the object should be metered; and,
   c) using the meta-level in order to meter exposure of the object.

50. The method of claim 49 wherein step a) comprises the step of inserting a reference to a control in the received HTML.

51. The method of claim 50 wherein step b) comprises the step of executing the control in order to meter the exposure of the object.

52. The method of claim 51 wherein the executing step comprises the step of detecting an image as an object in the HTML.

53. The method of claim 51 wherein the executing step comprises the step of determining when an object is displayed.

54. The method of claim 51 wherein the executing step comprises the step of determining an amount of an object viewable to a user.

55. The method of claim 51 wherein the executing step comprises the step of determining an amount of time that an object is being displayed.

56. The method of claim 51 wherein the executing step comprises the step of detecting an object having a predetermined size.

57. The method of claim 51 wherein the executing step comprises the step of detecting an HREF.

58. The method of claim 51 wherein the executing step comprises the step of detecting a cgi script URL.

59. The method of claim 51 wherein the executing step comprises the step of detecting an identification tag.

60. The method of claim 49 wherein step b) includes the following steps:
   detecting an HREF in the object; and,
   metering the object only if the HREF is detected.

61. The method of claim 49 wherein step b) includes the following steps:
   detecting a cgi script URL in the object; and,
   metering the object only if the cgi script URL is detected.

62. The method of claim 49 wherein step b) includes the following steps:
   detecting an identification tag in the object; and,
   metering the object only if the identification tag is detected.

63. A software meter, wherein the software meter is executed by a computer in order to meter exposure of an object contained in HTML received by the computer, wherein the computer runs a browser having a meta-level, and wherein the software meter includes a control arranged to access the meta-level in order to determine whether the object should be metered and to meter exposure of the object.

64. The software meter of claim 63 further comprising program code running on the computer so as to insert a reference to the control in the received HTML so that the browser executes the control in response to the reference.

65. A method of metering web content received by a computer, the web content comprising HTML, the method being implemented through execution of program code by the computer, and the method including the following steps:
   a) obtaining a list of objects in the web content by use of a meta-level of the program code; and
   b) metering exposure of at least some of the listed objects, wherein step b) includes the step of detecting an image contained in the HTML.

66. The method of claim 65, wherein step b) further includes the step of detecting an HREF in the HTML.

67. The method of claim 65, wherein step b) further includes the step of detecting a cgi script URL in the HTML.

68. A method of metering web content received by a computer, the method being implemented through execution of program code by the computer, the method including the following steps:
   a) obtaining a list of objects in the web content by use of a meta-level of the program code; and
   b) metering exposure of at least some of the listed objects, wherein step b) includes the step of detecting an image having a predetermined size.

69. The method of claim 68, wherein step b) further includes the step of determining when the image is displayed.

70. The method of claim 68, wherein step b) further includes the step of determining an amount of the image being displayed.

71. The method of claim 68, wherein step b) further includes the step of determining an amount of time that the image is being displayed.

* * * * *